July 17, 1951        A. Y. MONTGOMERY        2,561,286
DEVICE FOR APPLYING EMASCULATING RINGS
Filed Nov. 29, 1948        2 Sheets-Sheet 1
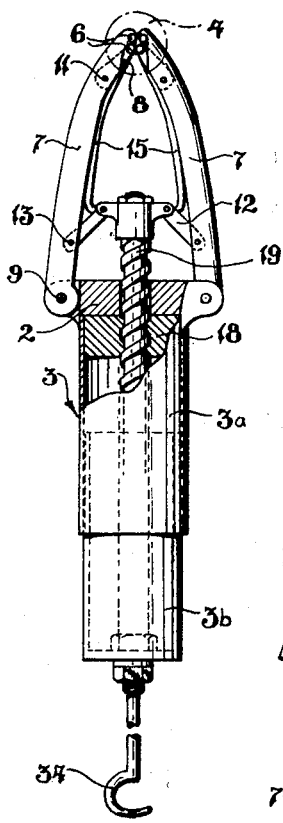
Fig.1.
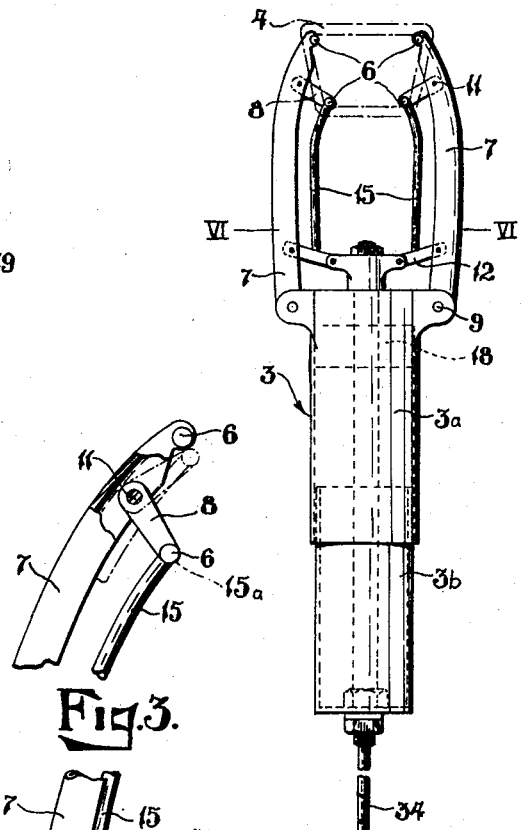
Fig.3.
Fig.2.
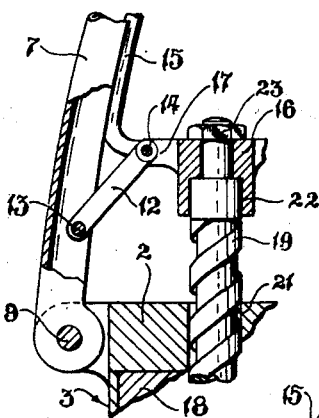
Fig.4.
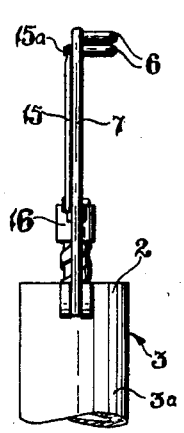
Fig.5.
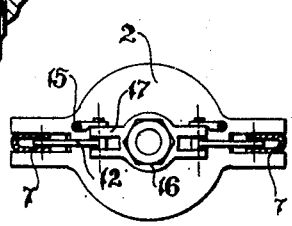
Fig.6.
INVENTOR
ALAN Y. MONTGOMERY
BY Young, Emery & Thompson Attys.

Patented July 17, 1951

2,561,286

UNITED STATES PATENT OFFICE 2,561,286

DEVICE FOR APPLYING EMASCULATING RINGS

Alan Yalden Montgomery, Brighton, Victoria, Australia

Application November 29, 1948, Serial No. 62,546
In Australia November 11, 1947

14 Claims. (Cl. 128—303)

This invention relates to devices for mechanically expanding rubber or like constricting rings for use in emasculating and/or detailing lambs and other animals by the well known bloodless method which employs such a ring to cut off the blood supply to the part to be removed thus causing the latter to atrophy and eventually drop off.

Existing devices for the purposes indicated have not proved to be entirely satisfactory due to the tiring manual effort required to actuate the device and the manner in which the ring is expanded and subsequently dislodged from the device on to the animal.

The primary object of the present invention is to provide an improved device for the purpose indicated which is adapted to permit such constricting rings to be readily expanded with a minimum of manual effort and in such a manner as to provide ample clearance for positioning the ring on the animal and subsequently releasing the ring from the expanding tool.

The proved device is of relatively simple and inexpensive construction and capable of being employed with all types of constricting rings of the type mentioned.

Another object of the invention is to provide an improved device of the kind indicated which is adapted when in use, to leave both of the operator's hands free, thus materially simplifying the operation of shifting the animals testicles from the groin into the scrotum on the outside of the constricting ring. Normally, this operation is particularly difficult to perform in that it must necessarily be carried out with one hand only, the operator's other hand being employed in holding the ring expanding device.

Hitherto, it has been customary to use plain rubber constricting rings for carrying out the operations mentioned and in order to reduce the normal period of approximately three to four weeks for completing the process, I have previously proposed the use of an improved type of constricting ring which is adapted to carry and apply a coating of a caustic, astringent, escharotic and/or therapeutant or other chemical agent to the skin of the animal around the zone of constriction.

A further object of the invention is to provide an improved ring expanding device which is adapted to enable the user to apply a chemical agent of the kind indicated around the skin of the scrotum or tail of the animal at the zone of constriction prior to the positioning of the constricting ring thereon. The improved device enables the amount of chemical agent employed to be regulated manually and thus varied in accordance with requirements.

It will be appreciated that the improved expanding device enables the advantages following upon the use of chemical agents of the type mentioned to be obtained in combination with the use of plain constricting rings although the improved device may obviously also be used with the improved chemical carrying ring if so desired.

Various other objects and novel constructional features of the improved ring expanding tool will be more readily apparent from the following description of several practical embodiments.

Referring to the drawings which form part of this specification—

Figure 1 is a part sectional side elevation of a constricting ring expanding device in accordance with one embodiment of the present invention and showing the device in its contracted position.

Figure 2 is a similar view of Figure 1 but showing the device in its operative or expanded position.

Figure 3 is a fragmentary part sectional detail on an enlarged scale, of portion of the ring expanding arms which form part of the improved device.

Figure 4 is a fragmentary enlarged detail showing the operative connections between the ring expanding arms and a common actuating member which also forms part of the improved device.

Figure 5 is a fragmentary side view of the upper end portion of the parts seen in Figure 1.

Figure 6 is a sectional plan taken on the lines VI—VI of Figure 2.

Figure 7:
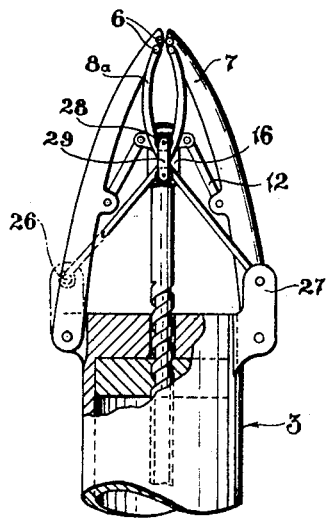
Figures 7 and 8 are side elevations of a modified ring expanding device showing the ring expanding arms in their contracted and expanded positions.

According to one practical embodiment, the improved device includes a supporting element 2 which may be of substantially disc-like formation. The latter is carried by an axially aligned handle 3 which is preferably of substantially cylindrical form and of any suitable length.

The supporting element is adapted to carry a plurality of spaced ring expanding arms each of which is provided at or adjacent to its outer end with a ring seating. The arrangement is such that when the arms occupy their contracted position the ring seatings are grouped close together so as to permit a rubber or like constricting ring 4 to readily pass thereover after which the arms are adapted to be moved apart so as to expand the ring to a predetermined size as hereinafter described.

The ring seatings preferably project laterally in relation to their ring expanding arms and may consist of relatively short pins 6 of sufficient length to pass through one of the constricting rings.

According to the embodiment illustrated in Figures 1 and 2, the ring expanding arms are preferably arranged in two opposed pairs which are located at opposite sides of the axis of the supporting element. Each pair of ring expanding arms preferably consists of a major arm and a minor arm 7 and 8 respectively, the major arm being pivotally connected at or adjacent to its inner end as at 9 to the supporting element whilst the minor arm may be pivotally connected as at 11 to the major arm at an intermediate point in its length.

Each minor arm 8 may be considerably shorter than its major arm and be pivotally connected at its inner end adjacent to the outer end of the major arm, the length of the minor arm being such that when it is swung towards the outer end of the major arm its ring seating pin 6 is brought into engagement with the associated pin on the major arm.

Associated with the foregoing are means for spreading the major arms 7 apart so as to move the ring seating pins on their outer ends away from each other and at the same time swing the minor arms 8 about their points of support on the major arms so as to simultaneously swing the ring seating pins on the minor arms apart from the ring seating pins on the major arms until they finally occupy a position substantially similar to that illustrated in Figure 2 of the drawings.

For this purpose, toggle like mechanism may be provided and such mechanism may include a plurality of thrust links 12 one for each of the major ring expanding arms. Each of these links may be pivoted at its outer end as at 13, to its major arm at an intermediate point in the length thereof. The opposite or inner ends of the thrust links are pivotally connected as at 14 to a common arm actuating member 16 located between said ring expanding arms and adapted to be moved axially of the supporting element so as to progressively straighten the thrust links into substantially the same plane. Each minor arm 8 is also preferably connected to the common arm actuating member for example by means of a pivoted link 15 which is connected at one end as at 15a to its minor arm and may be connected at its opposite end to the aforesaid pivot pin 14. The common arm actuating member 16 may be in the form of a block provided with opposed lugs 17 to receive the pivot pins carrying the major arms.

Manually operable means are provided for effecting relative movement between the common actuating member and the ring expanding arms so as to spread the latter as desired. Such manually operable means include a spiral ridge for effecting such relative movement.

For this purpose screw and nut mechanism is preferably employed. For example, the aforesaid handle may consist of hollow telescopic sections 3a and 3b respectively adapted to house the screw and nut mechanism. The nut 18 may be connected in any suitable manner within the outer handle section 3a whilst the inner handle section 3b may carry a screwed rod 19 which extends axially of the handle so as to pass through the nut and a central hole 21 in the supporting element 2. The outer end of the screwed rod may fit within a socket 22 in the common actuating member and be loosely anchored by a nut 23 or in any suitable manner so as to turn freely within its socket. Thus in use, relative turning movement between the handle sections 3a and 3b in the appropriate direction causes rearward longitudinal movement of the rod 19 and resultant spreading of the ring expanding arms as in Figure 2. Contraction of these arms is of course effected by relative rotation of the handle sections in the opposite direction. The common actuating member may also be adapted to function as a limit stop in that when it engages the adjacent surface of the supporting element, the constricting ring has been expanded to the desired predetermined size.

The length of the aforesaid thrust links 12 is also preferably predetermined so that when the common actuating member engages the supporting element the links and their pivotal connections may occupy a substantially dead centre position and thus retain the ring in the expanded condition until it is desired to release the ring from its seatings. In this regard, the screw thread upon the rod 19 may be of such a pitch as to be self locking in the nut and temporarily hold the constricting ring in any desired partially expanded position without manual effort when the handle section 3b is released. Alternatively the pitch of the screw thread on the rod may be such that it will turn freely in its nut under the influence of the expanded constricting ring immediately the thrust links have been returned from their dead centre locking position. This arrangement facilitates rapid contraction of the ring and its final dislodgment from its seating pins on to the animal.

Figure 8:
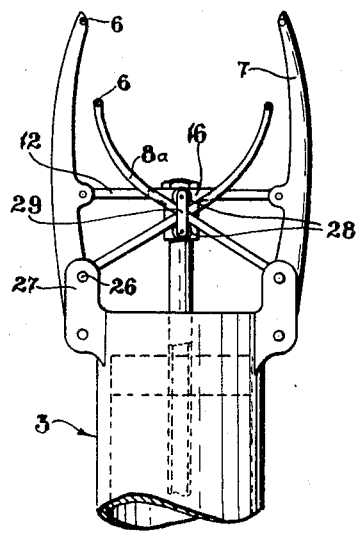

According to a modification as illustrated in Figs. 7 and 8, the aforesaid spaced pairs of ring expanding major and minor arms are all pivotally connected to the supporting element 2, each minor arm for example being pivotally connected as at 26 to an upstanding lug 27 on the supporting element so as to reduce its effective length in relation to its major arm.

In this case the opposed minor arms 8a are adapted to cross at an intermediate point in their length so that the outer end of each minor arm is located adjacent to the opposed major arm 7. The minor arms may be operatively connected to the common arm actuating member 16 at or adjacent to the point where the minor arms cross each other. Such an operative connection may include anti-friction rollers 28 carried by and spaced lengthwise of the common actuating member so as to accommodate the crossed portions of the minor arms therebetween. In order to prevent lateral displacement, a retaining strap 29 may be mounted on said common arm actuating member so as to bridge the crossed portions of the minor arms.

The major arms 7 may be operatively connected to the common arm actuating member by toggle thrust links 12 as aforesaid and the arrangement is such that as relative movement is effected between the common arm actuating member and the pairs of major and minor arms, the ring seatings 6 are simultaneously swung away from or towards each other with a minimum effort on the part of the user whilst in addition the seatings may be releasably held in the desired spaced relationship without manual effort.

Figure 10:
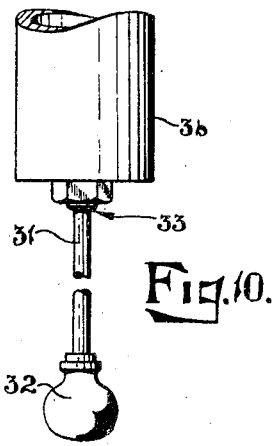
Figure 10 is a fragmentary side elevation of a still further modification in which the ring expanding device is provided with supplementary supporting means for temporarily holding the device whilst leaving both of the operator's hands free to position the constricting ring upon the animal.

Associated with the foregoing is holding means for operatively supporting the expanding device upon some part of the user's person in such a manner as to leave both hands free if so desired. According to one practical embodiment, said holding means includes a supporting arm 31 which may be connected in any suitable manner to the outer end of the turning handle and be provided at its outer end with a teeth gripping element 32 as in Fig. 10 so that the device may be supported by the user's teeth. The teeth gripping element may be of substantially spherical formation and be composed of rubber, wood, synthetic plastic or any other suitable material. Alternatively it may be of substantially disc like formation.

The supporting arm 31 is preferably fixed as at 33 to the outer end of the handle for example by means of screws, rivets, welding or in any other suitable manner. Alternatively the supporting arm may be formed integral with the handle.

Instead of being supported by the teeth of the user, the aforesaid holding means may consist of a hook or the like 34 on the supporting arm 31 for detachable connection to the user.

Instead of being fixed to the handle as aforesaid the supporting arm 31 may be rotatably connected thereto if so desired. Furthermore the supporting arm need not necessarily constitute an axial extension of the handle but may be connected thereto at any other suitable position.

Figures 9, 9A:
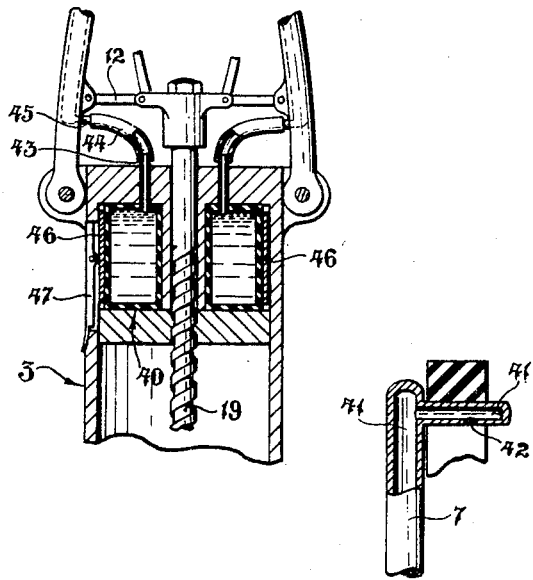
Figure 9 is a part sectional side elevation of a further modification wherein the ring expanding device is provided with means for applying a chemical agent to that part of the animal under treatment prior to the application of the constricting ring thereto.
Figure 9a is a fragmentary detail of the upper end portion of one of the ring expanding arms seen in Figure 9.

According to a modification as illustrated in Figs. 9 and 9a, the improved device is provided with a container 40 which may be carried by the handle 3 for holding a supply of a chemical medium capable of destroying and/or assisting in the healing of flesh tissue. The container may be of annular formation to fit within the handle and provide a central hole to pass the aforesaid screwed rod 19 or the like. In addition means are provided for delivering the chemical medium from the container to the discharge devices which are located on the ring expanding arms at or adjacent to the ring seatings 6 thereon so that the chemical medium may be applied to the skin of the animal at the zone of constriction prior to the application of the constricting ring thereto.

For this purpose, one or more of the ring expanding arms and if desired the ring seating pins, may be of hollow formation as at 41 and provided with a discharge orifice 42 located at or adjacent to its ring seating, each of the hollow arms being connected by pipes or passages with the chemical container.

The latter may be provided with a filling aperture and a closure cap therefor and a plurality of outlet ports, one for each of the hollow ring expanding arms. Each of these outlet ports may also be fitted with a nipple or the like 43 so that a rubber or any other suitable flexible feed pipe 44 may be fitted to each of the nipples on the container and also to a nipple 45 on one of the hollow arms.

The density of the chemical medium employed is normally sufficient to prevent it freely escaping through the outlet openings in the ends of the hollow arms. Consequently means are provided for expelling the chemical medium from the container and through the hollow arms. Thus the walls of the container may be flexible and any suitable means provided for compressing the container and thus expelling the contents therefrom. Such compressing means may consist for example, of a compressing element 46 engaging the side wall of the container and actuated by a finger lever 47 at one side of the handle.

In order to prevent the chemical medium drying out and possibly blocking the discharge holes, the latter may be fitted with a rubber plug or any other suitable cover capable of being readily removed when the device is required for use.

Instead of supplying the same chemical medium to all of the ring expanding arms, means may be provided for supplying a caustic, an escharotic or an astringent agent for example, to some of the hollow arms and a therapeutant such as an antiseptic, insecticide, fungicide, lavicide, deodorant, fly repellant, emollient or any other suitable chemical agent through the remaining hollow arms. A plurality of separate containers may be provided for the chemical agents or they may be packed in separate compartments of a unitary container. The latter may consist of a rubber bag or it may be composed of flexible metal or the like so that it may be readily collapsed.

The chemical mediums mentioned may be applied in liquid, colloid jelly, emulsion, creamed ointment, paste or powder form. Included in the several chemical agents suitable for the purpose mentioned are the following:

Nicotine dust, nicotine tannate, nicotine bentonite, derris powder and suitable extracts, pyrethrum powder and suitable extracts. Water soluble DDT. Finely divided sulphur, colloidal sulphur, zinc oxide, zinc sulphate, zinc chloride, borax and boric acid, salicylanilide, sodium salicylanilide, acriflavine, soap, e. g. potassium stearate, talcum powder, flour, and bentonite.

The latter type of ring expanding tool is economical in the use of the chemical agent employed in that it enables the amount applied to the animal to be regulated in accordance with requirements. Furthermore, it positively ensures the correct amount of the chemical agent being applied to the skin of the animal around the zone of constriction prior to the application of the rubber ring thereto. The improved device, thus enables the user to obtain the advantages of chemical agents of the kind indicated whilst using the relatively cheaper type of plain rubber constricting ring if so desired.

It will be appreciated from the foregoing that the improved constricting ring expanding device provides several important advantages over previous types of ring expanding devices. For example, the means employed for spreading the ring expanding arms, particularly the screw and nut or like mechanism, enables the operation to be effected with a minimum effort on the part of the user and under any suitable degree of control that may be required to avoid breakage of the rubber constricting rings. In addition the rubber rings may be temporarily held in their expanded form without manual effort until the ring has been operatively located on the animal and it is desired to retract the ring expanding arms for freeing the ring from its seating. By housing the screw and nut mechanism in the hollow handle the possibility of dust and dirt accumulating in the screw threads is materially reduced. If desired, the pitch of the screw thread may be predetermined so as to frictionally retain the ring expanding arms in any desired operative position, the device being thus self-locking so as to temporarily hold the rubber ring in its expanded state until it is desired to permit it to return to its original form.

The provision of the supplementary supporting means also enables the user to temporarily support the device in position whilst leaving both hands free if so desired.

Finally if the device is adapted to carry a supply of a chemical medium as aforesaid, the latter may be quickly and easily applied to the skin of the animal at the zone of constriction prior to the constricting ring being placed in position.

Various alterations, modifications and/or additions may be introduced into the foregoing construction and arrangement of parts without departing from the ambit of the invention as defined by the appended claims.

Having now described my invention, what I claim as new and desire to secure by Letters Patent is:

1. An improved device for expanding constricting rings comprising a supporting element fitted with a handle and carrying two pairs of ring expanding arms which are pivotally mounted on said supporting element in oppositely spaced relationship, all of said arms being provided at or adjacent to their outer ends with laterally projecting and relatively movable ring seatings, a common arm actuating member and manually operable means which includes a spiral ridge for effecting relative movement between said common arm actuating member and said arms for simultaneously moving said ring seatings away from or towards each other and also for releasably holding said seatings in spaced relationship without manual effort.

2. A device according to claim 1 wherein each pair of ring expanding arms consists of a major arm and a minor arm both of which are pivotally connected to said supporting element, said opposed minor arms being crossed at an intermediate point in their length so that the outer end of each minor arm is located adjacent to the opposed major arm, said minor arms being operatively connected together and to said common arm actuating member at or adjacent to the point where the minor arms cross each other.

3. An improved ring expanding device according to claim 1, in combination with holding means for enabling the user to temporarily support the device in position while leaving both hands free.

4. An improved ring expanding device according to claim 1, in combination with holding means for enabling the user to temporarily support the device in position while leaving both hands free, said holding means consisting of an extension on said handle and which is provided with a hook at the outer end thereof for detachable connection to the user.

5. An improved ring expanding device according to claim 1, in combination with holding means for enabling the user to temporarily support the device in position while leaving both hands free, said holding means consisting of an axial extension on said handle and which is provided at its outer end with an element for gripping between the teeth of the user.

6. An improved ring expanding device comprising a supporting element fitted with a handle and carrying two pairs of ring expanding arms which are located at opposite sides of the axis of said supporting element, all of said arms being provided at or adjacent to their outer ends with laterally projecting pins forming ring seatings, each pair of ring expanding arms consisting of a major arm which is pivotally connected at or adjacent to its inner end to said supporting element and a minor arm which is pivotally connected to its major arm at an intermediate point in the length thereof, a common arm actuating member located between and connected to said major arms and also to said minor arms by means of pivoted links, and screw and nut mechanism operatively connected to said common arm actuating member for moving it axially of said supporting element so as to simultaneously spread the ring seatings on said major arms apart and at the same time swing the ring seatings on said minor arms away from the ring seatings on said major arms.

7. A device according to claim 6 wherein each said minor arm is pivotally connected to its major arm adjacent to the outer end thereof, said minor arm being of such predetermined length that when its ring seating is swung towards the outer end of said major arm it is brought into engagement with the associated ring seating thereon.

8. A device according to claim 6 wherein said common arm actuating member is connected to said major arms by laterally extending toggle links each of which is pivotally connected at its outer end to one of said major arms at an intermediate point in the length thereof, the inner end of each toggle link being connected to said common arm actuating member by a pivot pin which is also connected to the pivoted link of one of said minor arms.

9. A device according to claim 1 wherein each pair of ring expanding arms consists of a major arm and a minor arm both of which are pivotally connected to said supporting element, said opposed minor arms being crossed at an intermediate joint in their length so that the outer end of each minor arm is located adjacent to the opposed major arm, said minor arms being operatively connected to said common arm actuating member at or adjacent to the point where the minor arms cross each other, said operative connection between said common arm actuating member and said minor arms including anti-friction rollers carried by and spaced lengthwise of said common actuating member so as to accommodate the crossed portions of said minor arms therebetween and a retaining strap which is also carried by said common arm actuating member and bridges the crossed portions of said minor arms.

10. A device according to claim 6 wherein said screw and nut mechanism is housed within said handle which consists of a pair of hollow telescopic sections with said nut mounted in one of the handle sections and a screwed rod carried by the other handle section so as to pass through said nut, said screwed rod being loosely connected at its outer end to said common arm actuating member in such a manner as to turn freely in relation thereto.

11. A device according to claim 1, in combination with a container carried by said handle for holding a supply of a chemical medium capable of destroying and/or assisting in the healing of flesh tissue and means for delivering said chemical medium from said container to discharge devices located on one or more of said ring expanding arms at or adjacent to said ring seatings so that said chemical medium may be applied to the skin of the animal at the zone on which the constricting ring is to be applied.

12. A device according to claim 1, in combination with a container carried by said handle for holding a supply of a chemical medium capable of destroying and/or assisting in the healing of flesh tissue and means for delivering said chemical medium from said container to discharge devices located on one or more of said ring expanding arms at or adjacent to said ring seatings so that said chemical medium may be applied to the skin of the animal at the zone on which the constricting ring is to be applied, one or more of said ring expanding arms being of hollow formation and provided with an outlet orifice located at or adjacent to its ring seating, each said hollow arm being connected by a pipe or passage with said container which is provided with means for expelling the chemical medium therefrom.

13. A device according to claim 1, in combination with a container carried by said handle for holding a supply of a chemical medium capable of destroying and/or assisting in the healing of flesh tissue and means for delivering said chemical medium from said container to discharge devices located on one or more of said ring expanding arms at or adjacent to said ring seatings so that said chemical medium may be applied to the skin of the animal at the zone on which the constricting ring is to be applied, said container being of a flexible character and provided with manually controllable means for squeezing the walls of the container for expelling its contents.

14. A device according to claim 1, in combination with a container carried by said handle for holding a supply of a chemical medium capable of destroying and/or assisting in the healing of flesh tissue and means for delivering said chemical medium from said container to discharge devices located on one or more of said ring expanding arms at or adjacent to said ring seatings so that said chemical medium may be applied to the skin of the animal at the zone on which the constricting ring is to be applied, said container being of substantially annular formation so as to provide a central passage to pass a screwed rod or other means employed for moving said common arm actuating member, said container being provided with a plurality of outlet ports, one for each of said ring expanding arms, each said outlet port being connected to a flexible feed pipe which is connected at its opposite end to one of said arms.

ALAN YALDEN MONTGOMERY.

REFERENCES CITED

The following references are of record in the file of this patent:

UNITED STATES PATENTS

| Number | Name | Date |
|---|---|---|
| 2,447,474 | Hammond | Aug. 17, 1948 |

FOREIGN PATENTS

| Number | Country | Date |
|---|---|---|
| 539,998 | Great Britain | Oct. 1, 1941 |